(12) United States Patent
Cui et al.

(10) Patent No.: US 9,910,131 B2
(45) Date of Patent: Mar. 6, 2018

(54) METHOD AND DEVICE FOR POSITIONING TERMINAL LOCATION

(71) Applicant: Huawei Technologies Co., Ltd., Shenzhen, Guangdong (CN)

(72) Inventors: Jie Cui, Shenzhen (CN); Anjian Li, Beijing (CN); Dengkun Xiao, Shenzhen (CN); Yongtong Wu, Shenzhen (CN); Qiming Sun, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 152 days.

(21) Appl. No.: 15/144,433

(22) Filed: May 2, 2016

(65) Prior Publication Data
US 2016/0245896 A1 Aug. 25, 2016

Related U.S. Application Data

(63) Continuation of application No. PCT/CN2013/086456, filed on Nov. 1, 2013.

(51) Int. Cl.
*G01S 5/02* (2010.01)
*H04W 64/00* (2009.01)

(52) U.S. Cl.
CPC ........... *G01S 5/0252* (2013.01); *H04W 64/00* (2013.01); *H04W 64/006* (2013.01)

(58) Field of Classification Search
CPC .... G01S 5/0252; H04W 64/006; H04W 64/00
See application file for complete search history.

(56) References Cited

U.S. PATENT DOCUMENTS

| | | | | |
|---|---|---|---|---|
| 6,064,339 A | * | 5/2000 | Wax | G01C 21/26 342/417 |
| 2010/0120422 A1 | * | 5/2010 | Cheung | G01S 5/0226 455/434 |
| 2010/0265093 A1 | | 10/2010 | Cho et al. | |
| 2012/0072106 A1 | | 3/2012 | Han et al. | |
| 2012/0088525 A1 | * | 4/2012 | Kurokawa | H04W 4/021 455/456.5 |
| 2014/0323153 A1 | | 10/2014 | Xiao | |

FOREIGN PATENT DOCUMENTS

| | | |
|---|---|---|
| CN | 101661096 A | 3/2010 |
| CN | 102573049 A | 7/2012 |
| CN | 103179658 A | 6/2013 |
| WO | WO 2005/094109 A1 | 10/2005 |

* cited by examiner

*Primary Examiner* — Marcos Torres

(57) ABSTRACT

The present invention discloses a method, which mainly includes: calculating location information of a estimated point by using a set algorithm according to location information of an original point; and calculating a wireless eigenvalue of the estimated point according to a wireless eigenvalue of the original point obtained by measuring; when a wireless eigenvalue reported by a terminal is received, positioning a location of the terminal according to the wireless eigenvalue of the original point and the wireless eigenvalue of the estimated point. In this way, in a mathematical model manner, location information and a wireless eigenvalue of an unmeasured raster point are fitted, with no need to increase an additional measurement workload, thereby saving a resource. In addition, a division granularity of raster measurement may be changed according to an actual requirement, thereby improving accuracy of terminal positioning.

16 Claims, 4 Drawing Sheets

METHOD AND DEVICE FOR POSITIONING TERMINAL LOCATION

CROSS REFERENCE TO RELATED APPLICATIONS

This application is a continuation of International Application No. PCT/CN2013/086456, filed on Nov. 1, 2013, which is hereby incorporated by reference in its entirety.

TECHNICAL FIELD

The present invention relates to the field of wireless communications, and in particular, to a method and device for positioning a terminal location.

BACKGROUND

A positioning technology is a technology used for determining a geographical location of a terminal, and location information of a terminal may be directly or indirectly obtained by using a resource of a wireless communication network. Currently, with continuous development of a mobile communications technology, some new positioning methods emerge, for example, an RFPM (radio frequency pattern matching) positioning method.

However, before a terminal adopts the RFPM positioning technology, a lot of preliminary work needs to be done on a network side (for example, a wireless coverage network is divided into each small raster, each small raster is measured, and an RSSI (received signal strength indication) of a base station or an AP (Access Point) surrounding each small raster is measured, thereby making preparations for positioning a terminal location. Therefore, it can be seen that, accuracy of terminal location positioning is closely related to a size of divided rasters. When an area occupied by one raster is relatively large, accuracy of terminal positioning is relatively low. When an area occupied by one raster is relatively small, a measurement workload is additionally increased, thereby wasting a lot of manpower and material resources, and reducing practicability of the RFPM positioning technology.

SUMMARY

Embodiments of the present invention provide a method and device for positioning a terminal location, so as to solve a problem of improving accuracy of terminal location positioning in an RFPM positioning technology while not increasing a measurement workload.

According to a first aspect of the present invention, a method for positioning a terminal location includes:

calculating to obtain location information of a estimated point by using a set algorithm according to location information of an original point; and calculating a wireless eigenvalue of the estimated point according to a wireless eigenvalue of the original point obtained by measuring; and when a wireless eigenvalue reported by a terminal is received, positioning a location of the terminal according to the wireless eigenvalue of the original point and the wireless eigenvalue of the estimated point.

In a possible implementation manner of the first aspect of the present invention, in a first possible implementation manner, the location information includes a latitude value and a longitude value; and the calculating location information of a estimated point by using a set algorithm according to location information of an original point obtained by measuring includes:

selecting at least three base points according to a point selection rule and the number of differential calculation times, where the base points include at least one or more of the original point and a estimated point that is obtained by calculating in the previous $T^{th}$ differential calculation, and locations of the at least three selected base points form an M-sided polygon, where T is a positive integer greater than zero and smaller than the number of differential calculation times, the $T+1^{th}$ differential calculation is being executed currently, and M is a positive integer not smaller than 3; and calculating a mean value of latitude values and a mean value of longitude values of the at least three selected base points, and using a location corresponding to the calculated mean value of the latitude values and the calculated mean value of the longitude values as location information of one estimated point.

In the first possible implementation manner of the first aspect of the present invention, in a second possible implementation manner, the location information further includes a height value; and after the mean value of the latitude values and the mean value of the longitude values of the at least three selected base points are obtained by calculating, the method further includes:

calculating a mean value of height values of the at least three selected base points, and using a location corresponding to the calculated mean value of the latitude values, the calculated mean value of the longitude values, and the calculated mean value of the height values as location information of one estimated point.

In the possible implementation manner of the first aspect of the present invention, or in the first possible implementation manner of the first aspect of the present invention, in a third possible implementation manner, selecting three base points according to the point selection rule and the number of differential calculation times includes:

when the number of differential calculation times is N, selecting, according to the following manner, base points executing a differential calculation each time, where three base points selected each time form a triangle:

base points of the first differential calculation are three original points obtained by measuring;

base points of the second differential calculation are two original points obtained by measuring and one estimated point obtained after the first differential calculation;

base points of the third differential calculation are one original point obtained by measuring, one estimated point obtained after the first differential calculation, and one estimated point obtained after the second differential calculation, or are two original points obtained by measuring and one estimated point obtained after the second differential calculation; and base points of the $N^{th}$ differential calculation are two original points obtained by measuring and one estimated point obtained after the $N-1^{th}$ differential calculation, or are one estimated point obtained after the $N-A^{th}$ differential calculation, one estimated point obtained after the $N-B^{th}$ differential calculation, and one estimated point obtained after the $N-1^{th}$ differential calculation, where N is greater than 3 and is the set number of differential times, and A is different from B and is a positive integer smaller than N.

In the possible implementation manner of the first aspect of the present invention, or in the first possible implementation manner of the first aspect of the present invention, in a fourth possible implementation manner, the selecting four base points according to the point selection rule and the number of differential calculation times includes:

when the number of differential calculation times is N, selecting, according to the following manner, base points executing a differential calculation each time, where four base points selected each time form a tetragon:

base points of the first differential calculation are four original points obtained by measuring;

base points of the second differential calculation are two original points obtained by measuring and two estimated points obtained after the first differential calculation;

base points of the third differential calculation are one original point obtained by measuring, one estimated point obtained after the first differential calculation, and two estimated points obtained after the second differential calculation; and base points of the $N^{th}$ differential calculation are two estimated points obtained after the $N-1^{th}$ differential calculation, one estimated point obtained after the $N-2^{th}$ differential calculation, and one point selected from a estimated point obtained after the previous $N-3^{th}$ differential calculation and the original point, where N is a positive integer greater than 3.

In the possible implementation manner of the first aspect of the present invention, or in the first possible implementation manner of the first aspect of the present invention, or in the second possible implementation manner of the first aspect of the present invention, or in the third possible implementation manner of the first aspect of the present invention, or in the fourth possible implementation manner of the first aspect of the present invention, in a fifth possible implementation manner, calculating a wireless eigenvalue of the estimated point according to a wireless eigenvalue of the original point obtained by measuring includes:

determining the location information that is of the original point and used for calculating the estimated point;

obtaining, by using a geographic information system GIS according to the determined location information of the original point, a weight factor of a wireless eigenvalue of each determined original point relative to the estimated point that is obtained by calculating; and calculating the wireless eigenvalue of the estimated point according to the wireless eigenvalue of the determined original point and the corresponding weight factor.

In the possible implementation manner of the first aspect of the present invention, or in the first possible implementation manner of the first aspect of the present invention, or in the second possible implementation manner of the first aspect of the present invention, or in the third possible implementation manner of the first aspect of the present invention, or in the fourth possible implementation manner of the first aspect of the present invention, or in the fifth possible implementation manner of the first aspect of the present invention, in a sixth possible implementation manner, after the wireless eigenvalue reported by the terminal is received, the method further includes:

determining, according to the wireless eigenvalue reported by the terminal, a serving cell in which the terminal is currently located; and obtaining, according to a signal coverage area of the serving cell, an original point and a estimated point that exist within the signal coverage area of the serving cell.

In the sixth possible implementation manner of the first aspect of the present invention, in a seventh possible implementation manner, the positioning a location of the terminal according to the wireless eigenvalue of the original point and the wireless eigenvalue of the estimated point includes:

separately calculating a Euclidean distance between the wireless eigenvalue reported by the terminal and the obtained wireless eigenvalue of the original point, and a Euclidean distance between the wireless eigenvalue reported by the terminal and the obtained wireless eigenvalue of the estimated point; and determining a location corresponding to a wireless eigenvalue with a Euclidean distance that is obtained by calculating and smaller than a set threshold, and positioning the determined location as the location of the terminal.

In the possible implementation manner of the first aspect of the present invention, or in the first possible implementation manner of the first aspect of the present invention, or in the second possible implementation manner of the first aspect of the present invention, or in the third possible implementation manner of the first aspect of the present invention, or in the fourth possible implementation manner of the first aspect of the present invention, or in the fifth possible implementation manner of the first aspect of the present invention, or in the sixth possible implementation manner of the first aspect of the present invention, or in the seventh possible implementation manner of the first aspect of the present invention, in an eighth possible implementation manner, the wireless eigenvalue includes at least one or more of the following: a wireless signal strength indicator, a wireless signal time amount, a wireless signal frequency value, and a wireless signal codeword.

According to a second aspect of the present invention, a device for positioning a terminal location includes:

a location information calculating module, configured to calculate location information of a estimated point by using a set algorithm according to location information of an original point; and a wireless eigenvalue calculating module, configured to calculate a wireless eigenvalue of the estimated point according to a wireless eigenvalue of the original point obtained by measuring; and a positioning module, configured to: when a wireless eigenvalue reported by a terminal is received, position a location of the terminal according to the wireless eigenvalue of the original point and the wireless eigenvalue of the estimated point obtained by calculating by using the wireless eigenvalue calculating module.

In a possible implementation manner of the second aspect of the present invention, in a first possible implementation manner, the location information includes a latitude value and a longitude value; and the location information calculating module is specifically configured to select at least three base points according to a point selection rule and the number of differential calculation times, where the base points include at least one or more of the original point and a estimated point that is obtained by calculating in the previous $T^{th}$ differential calculation, and locations of the at least three selected base points form an M-sided polygon, where T is a positive integer greater than zero and smaller than the number of differential calculation times, the $T+1^{th}$ differential calculation is being executed currently, and M is a positive integer not smaller than 3; and calculate a mean value of latitude values and a mean value of longitude values of the at least three selected base points, and use a location corresponding to the calculated mean value of the latitude values and the calculated mean value of the longitude values as location information of one estimated point.

In the first possible implementation manner of the second aspect of the present invention, in a second possible implementation manner, the location information further includes a height value; and the location information calculating module is further configured to calculate a mean value of height values of the at least three selected base points, and use a location corresponding to the calculated mean value of the latitude values, the calculated mean value of the longitude values, and the calculated mean value of the height values as location information of one estimated point.

In the possible implementation manner of the second aspect of the present invention, or in the first possible implementation manner of the second aspect of the present invention, in a third possible implementation manner, the location information calculating module is specifically configured to: when the number of differential calculation times is N, select, according to the following manner, base points executing a differential calculation each time, where three base points selected each time form a triangle:

base points of the first differential calculation are three original points obtained by measuring;

base points of the second differential calculation are two original points obtained by measuring and one estimated point obtained after the first differential calculation;

base points of the third differential calculation are one original point obtained by measuring, one estimated point obtained after the first differential calculation, and one estimated point obtained after the second differential calculation, or are two original points obtained by measuring and one estimated point obtained after the second differential calculation; and base points of the $N^{th}$ differential calculation are two original points obtained by measuring and one estimated point obtained after the $N-1^{th}$ differential calculation, or are one estimated point obtained after the $N-A^{th}$ differential calculation, one estimated point obtained after the $N-B^{th}$ differential calculation, and one estimated point obtained after the $N-1^{th}$ differential calculation, where N is greater than 3 and is the set number of differential times, and A is different from B and is a positive integer smaller than N.

In the possible implementation manner of the second aspect of the present invention, or in the first possible implementation manner of the second aspect of the present invention, in a fourth possible implementation manner, the location information calculating module is specifically configured to: when the number of differential calculation times is N, select, according to the following manner, base points executing a differential calculation each time, where four base points selected each time form a tetragon:

base points of the first differential calculation are four original points obtained by measuring;

base points of the second differential calculation are two original points obtained by measuring and two estimated points obtained after the first differential calculation;

base points of the third differential calculation are one original point obtained by measuring, one estimated point obtained after the first differential calculation, and two estimated points obtained after the second differential calculation; and base points of the $N^{th}$ differential calculation are two estimated points obtained after the $N-1^{th}$ differential calculation, one estimated point obtained after the $N-2^{th}$ differential calculation, and one point selected from a estimated point obtained after the previous $N-3^{th}$ differential calculation and the original point, where N is a positive integer greater than 3.

In the possible implementation manner of the second aspect of the present invention, or in the first possible implementation manner of the second aspect of the present invention, or in the second possible implementation manner of the second aspect of the present invention, or in the third possible implementation manner of the second aspect of the present invention, or in the fourth possible implementation manner of the second aspect of the present invention, in a fifth possible implementation manner, the wireless eigenvalue calculating module is specifically configured to determine the location information that is of the original point and used for calculating the estimated point:

obtain, by using a geographic information system GIS according to the determined location information of the original point, a weight factor of a wireless eigenvalue of each determined original point relative to the estimated point that is obtained by calculating; and calculate the wireless eigenvalue of the estimated point according to the wireless eigenvalue of the determined original point and the corresponding weight factor.

In the possible implementation manner of the second aspect of the present invention, or in the first possible implementation manner of the second aspect of the present invention, or in the second possible implementation manner of the second aspect of the present invention, or in the third possible implementation manner of the second aspect of the present invention, or in the fourth possible implementation manner of the second aspect of the present invention, or in the fifth possible implementation manner of the second aspect of the present invention, in a sixth possible implementation manner, the device further includes:

a location information selecting module, specifically configured to: after the wireless eigenvalue reported by the terminal is received, determine, according to the wireless eigenvalue reported by the terminal, a serving cell in which the terminal is currently located; and obtain, according to a signal coverage area of the serving cell, an original point and a estimated point that exist within the signal coverage area of the serving cell.

In the sixth possible implementation manner of the second aspect of the present invention, in a seventh possible implementation manner, the positioning module is specifically configured to separately calculate a Euclidean distance between the wireless eigenvalue reported by the terminal and the obtained wireless eigenvalue of the original point, and a Euclidean distance between the wireless eigenvalue reported by the terminal and the obtained wireless eigenvalue of the estimated point; and determine a location corresponding to a wireless eigenvalue with a Euclidean distance that is obtained by calculating and smaller than a set threshold, and position the determined location as the location of the terminal.

In the possible implementation manner of the second aspect of the present invention, or in the first possible implementation manner of the second aspect of the present invention, or in the second possible implementation manner of the second aspect of the present invention, or in the third possible implementation manner of the second aspect of the present invention, or in the fourth possible implementation manner of the second aspect of the present invention, or in the fifth possible implementation manner of the second aspect of the present invention, or in the sixth possible implementation manner of the second aspect of the present invention, or in the seventh possible implementation manner of the second aspect of the present invention, in an eighth possible implementation manner, the wireless eigenvalue includes at least one or more of the following: a wireless signal strength indicator, a wireless signal time amount, a wireless signal frequency value, and a wireless signal codeword.

According to a third aspect of the present invention, a device for positioning a terminal location includes:

an arithmetic logic unit, configured to calculate location information of a estimated point by using a set algorithm according to location information of an original point; and calculate a wireless eigenvalue of the estimated point according to a wireless eigenvalue of the original point obtained by measuring; and a processor, configured to: when a wireless eigenvalue reported by a terminal is received, position a location of the terminal according to the wireless eigenvalue of the original point and the wireless eigenvalue of the estimated point.

In a possible implementation manner of the third aspect of the present invention, in a first possible implementation manner, the location information includes a latitude value and a longitude value; and the arithmetic logic unit is specifically configured to select at least three base points according to a point selection rule and the number of differential calculation times, where the base points include at least one or more of the original point and a estimated point that is obtained by calculating in the previous $T^{th}$ differential calculation, and locations of the at least three selected base points form an M-sided polygon, where T is a positive integer greater than zero and smaller than the number of differential calculation times, the $T+1^{th}$ differential calculation is being executed currently, and M is a positive integer not smaller than 3; and calculate a mean value of latitude values and a mean value of longitude values of the at least three selected base points, and use a location corresponding to the calculated mean value of the latitude values and the calculated mean value of the longitude values as location information of one estimated point.

In a first possible implementation manner of the third aspect of the present invention, in a second possible implementation manner, the location information further includes a height value; and the arithmetic logic unit is further configured to: after the mean value of the latitude values and the mean value of the longitude values of the at least three selected base points are obtained by calculating, calculate a mean value of height values of the at least three selected base points, and use a location corresponding to the calculated mean value of the latitude values, the calculated mean value of the longitude values, and the calculated mean value of the height values as location information of one estimated point.

In the possible implementation manner of the third aspect of the present invention, or in the first possible implementation manner of the third aspect of the present invention, in a third possible implementation manner, the arithmetic logic unit is specifically configured to: when the number of differential calculation times is N, select, according to the following manner, base points executing a differential calculation each time, where three base points selected each time form a triangle:

base points of the first differential calculation are three original points obtained by measuring;

base points of the second differential calculation are two original points obtained by measuring and one estimated point obtained after the first differential calculation;

base points of the third differential calculation are one original point obtained by measuring, one estimated point obtained after the first differential calculation, and one estimated point obtained after the second differential calculation, or are two original points obtained by measuring and one estimated point obtained after the second differential calculation; and base points of the $N^{th}$ differential calculation are two original points obtained by measuring and one estimated point obtained after the N–$1^{th}$ differential calculation, or are one estimated point obtained after the N–$A^{th}$ differential calculation, one estimated point obtained after the N–$B^{th}$ differential calculation, and one estimated point obtained after the N–$1^{th}$ differential calculation, where N is greater than 3 and is the set number of differential times, and A is different from B and is a positive integer smaller than N.

In the possible implementation manner of the third aspect of the present invention, or in the first possible implementation manner of the third aspect of the present invention, in a fourth possible implementation manner, the arithmetic logic unit is specifically configured to: when the number of differential calculation times is N, select, according to the following manner, base points executing a differential calculation each time, where four base points selected each time form a tetragon:

base points of the first differential calculation are four original points obtained by measuring;

base points of the second differential calculation are two original points obtained by measuring and two estimated points obtained after the first differential calculation;

base points of the third differential calculation are one original point obtained by measuring, one estimated point obtained after the first differential calculation, and two estimated points obtained after the second differential calculation; and base points of the $N^{th}$ differential calculation are two estimated points obtained after the N–$1^{th}$ differential calculation, one estimated point obtained after the N–$2^{th}$ differential calculation, and one point selected from a estimated point obtained after the previous N–$3^{th}$ differential calculation and the original point, where N is a positive integer greater than 3.

In the possible implementation manner of the third aspect of the present invention, or in the first possible implementation manner of the third aspect of the present invention, or in the second possible implementation manner of the third aspect of the present invention, or in the third possible implementation manner of the third aspect of the present invention, or in the fourth possible implementation manner of the third aspect of the present invention, in a fifth possible implementation manner, the arithmetic logic unit is specifically configured to determine the location information that is of the original point and used for calculating the estimated point;

obtain, by using a geographic information system GIS according to the determined location information of the original point, a weight factor of a wireless eigenvalue of each determined original point relative to the estimated point that is obtained by calculating; and calculate the wireless eigenvalue of the estimated point according to the wireless eigenvalue of the determined original point and the corresponding weight factor.

In the possible implementation manner of the third aspect of the present invention, or in the first possible implementation manner of the third aspect of the present invention, or in the second possible implementation manner of the third aspect of the present invention, or in the third possible implementation manner of the third aspect of the present invention, or in the fourth possible implementation manner of the third aspect of the present invention, or in the fifth possible implementation manner of the third aspect of the present invention, in a sixth possible implementation manner, the processor is further configured to: after the wireless eigenvalue reported by the terminal is received, determine, according to the wireless eigenvalue reported by the terminal, a serving cell in which the terminal is currently located; and obtain, according to a signal coverage area of the serving cell, an original point and a estimated point that exist within the signal coverage area of the serving cell.

In the sixth possible implementation manner of the third aspect of the present invention, in a seventh possible implementation manner, the processor is specifically configured to separately calculate a Euclidean distance between the wireless eigenvalue reported by the terminal and the obtained wireless eigenvalue of the original point, and a Euclidean distance between the wireless eigenvalue reported by the terminal and the obtained wireless eigenvalue of the estimated point; and determine a location corresponding to a wireless eigenvalue with a Euclidean distance that is obtained by calculating and smaller than a set threshold, and position the determined location as the location of the terminal.

In the possible implementation manner of the third aspect of the present invention, or in the first possible implementation manner of the third aspect of the present invention, or in the second possible implementation manner of the third aspect of the present invention, or in the third possible implementation manner of the third aspect of the present invention, or in the fourth possible implementation manner of the third aspect of the present invention, or in the fifth possible implementation manner of the third aspect of the present invention, or in the sixth possible implementation manner of the third aspect of the present invention, or in the seventh possible implementation manner of the third aspect of the present invention, in an eighth possible implementation manner, the wireless eigenvalue includes at least one or more of the following: a wireless signal strength indicator, a wireless signal time amount, a wireless signal frequency value, and a wireless signal codeword.

Beneficial effects of the present invention are as follows:

In the embodiments of the present invention, location information of a estimated point is calculated by using a set algorithm according to location information of an original point; and a wireless eigenvalue of the estimated point is calculated according to a wireless eigenvalue of the original point obtained by measuring; and when a wireless eigenvalue reported by a terminal is received, a location of the terminal is positioned according to the wireless eigenvalue of the original point and the wireless eigenvalue of the estimated point. In this way, in a mathematical model manner, location information and a wireless eigenvalue of an unmeasured raster point are fitted, with no need to increase an additional measurement workload, thereby saving a resource. In addition, a division granularity of raster measurement may be changed according to an actual requirement, thereby improving accuracy of terminal positioning.

DETAILED DESCRIPTION

In order to implement the objective of the present invention, embodiments of the present invention provide a method and device for positioning a terminal location. Location information of a estimated point is calculated by using a set algorithm according to location information of an original point; and after a wireless eigenvalue reported by a terminal is received, a location of the terminal is positioned according to a wireless eigenvalue of the original point obtained by measuring and a wireless eigenvalue of the estimated point. In this way, in a mathematical model manner, location information and a wireless eigenvalue of an unmeasured raster point are fitted, with no need to increase an additional measurement workload, thereby saving a resource. In addition, a division granularity of raster measurement may be changed according to an actual requirement, thereby improving accuracy of terminal positioning.

For ease of description of the following embodiments, a point obtained by measuring is called an original point, a point obtained by calculating after the first differential algorithm is called a first estimated point; a point obtained by calculating after the second differential algorithm is called a second estimated point; . . . ; and so on, a point obtained by calculating after the $N^{th}$ differential algorithm is called an $N^{th}$ estimated point.

It should be noted that, the first differential algorithm is performed by using the original point, which is obtained by measuring, as a base point.

The following describes the embodiments of the present invention in detail with reference to the accompanying drawings.

Embodiment 1

Figure 1:
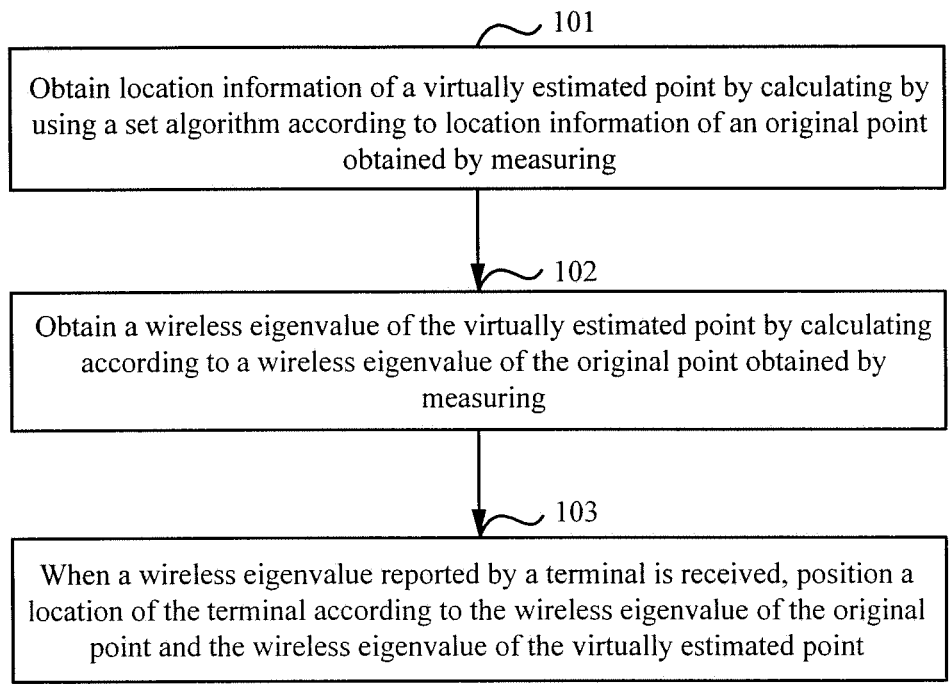
FIG. 1 is a flowchart of a method for positioning a terminal location according to Embodiment 1 of the present invention.

As shown in FIG. 1, which is a flowchart of a method for positioning a terminal location according to Embodiment 1 of the present invention, the method includes:

Step 101: Obtain location information of a estimated point by calculating by using a set algorithm according to location information of an original point.

In step 101, because a standard terminal location positioning manner used in LTE (long term evolution) includes but is not limited to the following three manners: manner 1: network aided GNSS (Global Navigation Satellite System) positioning; manner 2: OTDOA (Observed Time Difference Of Arrival) positioning; and manner 3: E-CID (Enhanced Cell Identification) positioning.

Specifically, a positioning algorithm used in terminal location positioning in LTE is generally to detect a characteristic parameter of a wireless signal between a terminal and a base station, and estimate a geographical location of the terminal according to a preset positioning algorithm.

However, accuracy of determining the geographical location of the terminal in the foregoing three manners is relatively low.

An RFPM positioning technology is put forward in the art. A wireless coverage network is divided into small rasters, a wireless eigenvalue of each small raster is measured, and a location of a terminal is determined by using the wireless eigenvalue obtained by measuring.

Generally, to reduce a measurement workload, a granularity of dividing the wireless coverage network into small rasters is relatively large. In this way, accuracy of determining a terminal location according to a wireless eigenvalue that is of each small raster and obtained by calculating is relatively low. Therefore, more raster points (that is, estimated points) are further obtained by using a preset difference algorithm based on an existing original point obtained by calculating.

Specifically, the number of times that a differential algorithm is executed is determined according to accuracy of terminal location positioning.

It should be noted that, the determined number of times that a differential algorithm is executed herein refers to the number of times that a differential algorithm is executed on a group of original points.

For example, the number of original points obtained by measuring is 8, and the 8 points obtained by measuring may be used as a group of original points. In this case, the determined number of times that a differential algorithm is executed is 3, the 8 original points obtained by measuring are used as base points, and a difference calculation is executed for 3 times successively (where except that the first difference calculation is performed by using the 8 points as base points, the number of base points selected for other differential calculations may be smaller than 8).

For another example, the number of original points obtained by measuring is 8, and the 8 points obtained by measuring may be evenly divided into two groups of original points. In this case, the determined number of times that a differential algorithm is executed is 3, the two groups of original points obtained by dividing are used as base points, and a difference calculation is executed on each group of original points for 3 times successively (where except that the first difference calculation is performed by using 4 points as base points, the number of base points selected for other differential calculations may be smaller than 4).

Generally, the determined number of differential algorithm times is 3, and is not limited herein.

Figure 2:
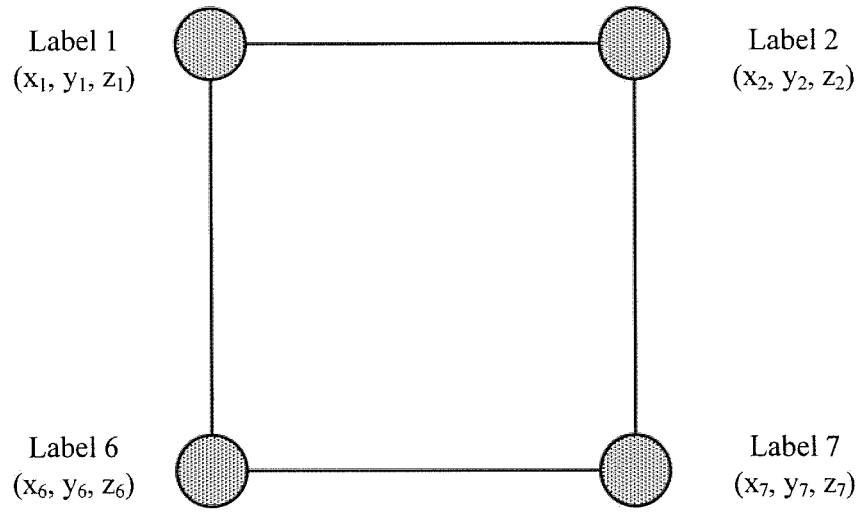
FIG. 2 is a schematic diagram of an original point obtained by measuring.

In the following manner, a first estimated point after the first difference calculation is obtained by calculating by using a set algorithm according to location information of an original point obtained by measuring; as shown in FIG. 2. FIG. 2 is a schematic diagram of an original point obtained by measuring.

Specifically, at least three points are first selected according to a point selection rule from original points obtained by measuring.

Locations of the at least three selected points at least meet a condition that a triangle can be formed.

Assuming that the number of differential calculation times is N, and a currently executed differential calculation is not the first time, that is, a differential calculation is performed after the first differential calculation performed by using the original point. At least 3 required base points are selected for each differential calculation, where the at least three selected base points include one or more of an original point and a estimated point that is obtained by calculating in the previous $T^{th}$ differential calculation, and locations of the at least three selected base points form an M-sided polygon, where T is a positive integer greater than zero and smaller than the number of differential calculation times, the $T+1^{th}$ differential calculation is being executed currently, and M is a positive integer not smaller than 3.

When the number of base points selected for each differential calculation is 3, base points for executing each differential calculation are selected in the following manner:

base points of the first differential calculation are three original points obtained by measuring;

base points of the second differential calculation are two original points obtained by measuring and one estimated point obtained after the first differential calculation;

base points of the third differential calculation are one original point obtained by measuring, one estimated point obtained after the first differential calculation, and one estimated point obtained after the second differential calculation, or are two original points obtained by measuring and one estimated point obtained after the second differential calculation; and base points of the $N^{th}$ differential calculation are two original points obtained by measuring and one estimated point obtained after the $N-1^{th}$ differential calculation, or are one estimated point obtained after the $N-A^{th}$ differential calculation, one estimated point obtained after the $N-B^{th}$ differential calculation, and one estimated point obtained after the $N-1^{th}$ differential calculation, where N is greater than 3 and is the set number of differential times, and A is different from B and is a positive integer smaller than N.

It should be noted that, each differential calculation may not always be a one-time calculation. For example, three original points obtained by measuring are selected for the first differential calculation; and one estimated point is obtained after one differential calculation is performed according to location information of the three selected original points. In this case, if the second differential calculation is further performed, two original points obtained by measuring and one estimated point obtained after the first differential calculation are selected. There are three manners of selecting two original points obtained by measuring (for example, labels, for selection, of the original points obtained by measuring are 1, 2, and 6, and two selected original points may be labels 1 and 2, labels 1 and 6, or labels 2 and 6). In this case, 3 rounds of the second differential calculation are performed, and all the 3 rounds of differential calculation are considered as the second differential calculation.

When the number of differential calculation times is N and the number of base points that need to be selected for each differential calculation is 4, the four base points to be selected need to form a tetragon, and base points for executing each differential calculation are selected in the following manner:

base points of the first differential calculation are four original points obtained by measuring;

base points of the second differential calculation are two original points obtained by measuring and two estimated points obtained after the first differential calculation;

base points of the third differential calculation are one original point obtained by measuring, one estimated point obtained after the first differential calculation, and two estimated points obtained after the second differential calculation; and base points of the $N^{th}$ differential calculation are two estimated points obtained after the $N-1^{th}$ differential calculation, one estimated point obtained after the $N-2^{th}$ differential calculation, and one point selected from a estimated point obtained after the previous N–3$^{th}$ differential calculation and the original point, where N is a positive integer greater than 3.

In addition, it is limited that base points selected when the first differential calculation is performed are four points, that is, four points are selected from the original points obtained by measuring, where locations of the selected four points form a quadrangle, and an occupied area is relatively small (or a square with the smallest unit). Any three may further be selected from the four original points, and a estimated point is obtained by executing a differential calculation by using location information of the any three selected points. That is to say, the number of estimated points obtained in the first differential calculation includes but is not limited to 1.

For example, in a schematic diagram of an original point shown in FIG. 2, according to a point selection rule, labels of four selected points are 1, 2, 6, and 7.

Then, location information of the four selected points is determined.

The location information includes a latitude value and a longitude value.

It should be noted that, the location information is not limited to including the latitude value, the longitude value, and a height value, and may also include the latitude value and the longitude value only.

For example, location information of the selected point with the label being 1 is $(x_1,y_1)$; location information of the selected point with the label being 2 is $(x_2,y_2)$; location information of the selected point with the label being 6 is $(x_6,y_6)$; and location information of the selected point with the label being 7 is $(x_7,y_7)$.

Alternatively, location information of the selected point with the label being is $(x_1,y_1,z_1)$; location information of the selected point with the label being 2 is $(x_2,y_2,z_2)$; location information of the selected point with the label being 6 is $(x_6,y_6,z_6)$; and location information of the selected point with the label being 7 is $(x_7,y_7,z_7)$.

Finally, location information of a first estimated point is obtained according to location information of the four selected points.

Because location information of an original point is manifested in multiple manners, the following uses location information including a latitude value, a longitude value, and a height value as an example to describe calculation of a estimated point in detail.

Specifically, a manner of obtaining location information of a first estimated point includes but is not limited to:

Manner 1: Determine barycentric coordinates of an image formed by selected points, and use a location where the barycentric coordinates is located as location information of a first estimated point.

For example, an image formed by the selected labels 1, 2, 6 and 7 is a square, barycentric coordinates of the square formed by the labels 1, 2, 6 and 7 are $[(x_1+x_2+x_6+x_7)/4, (y_1+y_2+y_6+y_7)/4, (z_1+z_2+z_6+z_7)/4]$, that is, the location information of the first estimated point is $[(x_1+x_2+x_6+x_7)/4, (y_1+y_2+y_6+y_7)/4, (z_1+z_2+z_6+z_7)/4]$.

Manner 2: Calculate location information of a first estimated point in a linear averaging manner.

That is, a mean value of latitude values of selected points, a mean value of longitude values of the selected points, and a mean value of height values of the selected points are calculated, and a location corresponding to the calculated mean value of the latitude values, the calculated mean value of the longitude values, and the calculated mean value of the height values as the location information of the first estimated point.

For example, labels of the selected points are 1, 2, 6 and 7, and then a mean value of latitude values of the points with the labels being 1, 2, 6 and 7 is calculated to be $(x_1+x_2+x_6+x_7)/4$, a mean value of longitude values of the points with the labels being 1, 2, 6 and 7 is calculated to be $(y_1+y_2+y_6+y_7)/4$, and a mean value of height values of points with the labels being 1, 2, 6 and 7 is calculated to be $(z_1+z_2+z_6+z_7)/4$. In this case, a location determined together by $(x_1+x_2+x_6+x_7)/4$, $(y_1+y_2+y_6+y_7)/4$ and $(z_1+z_2+z_6+z_7)/4$ is the location information of the first estimated point.

In addition, three points are randomly selected from the four selected original points as base points for a differential calculation, location information of a estimated point is obtained by using a preset algorithm according to location information of the three randomly selected points.

For example, labels of three randomly selected points are 1, 2 and 6, location information of a selected point with the label being 1 is $(x_1,y_1,z_1)$; location information of a selected point with the label being 2 is $(x_2,y_2,z_2)$; and location information of a selected point with the label being 6 is $(x_6,y_6,z_6)$, and the location information of the estimated point obtained by calculating is $[(x_1+x_2+x_6)/3, (y_1+y_2+y_6)/3, (z_1+z_2+z_6)/3]$.

Labels of three randomly selected points are 1, 2 and 7, location information of a selected point with the label being 1 is $(x_1,y_1,z_1)$; location information of a selected point with the label being 2 is $(x_2,y_2,z_2)$; and location information of a selected point with the label being 7 is $(x_7,y_7,z_7)$, and the location information of the estimated point obtained by calculating is $[(x_1+x_2+x_7)/3, (y_1+y_2+y_7)/3, (z_1+z_2+z_7)/3]$.

Labels of three randomly selected points are 1, 6 and 7, location information of a selected point with the label being 1 is $(x_1,y_1,z_1)$; location information of a selected point with the label being 6 is $(x_6,y_6,z_6)$; and location information of a selected point with the label being 7 is $(x_7,y_7,z_7)$, and the location information of the estimated point obtained by calculating is $[(x_1+x_6+x_7)/3, (y_1+y_6+y_7)/3, (z_1+z_6+z_7)/3]$.

Labels of three randomly selected points are is 2, 6 and 7, location information of a selected point with the label being 2 is $(x_2,y_2,z_2)$; location information of a selected point with the label being 6 is $(x_6,y_6,z_6)$; and location information of a selected point with the label being 7 is $(x_7,y_7,z_7)$, and the location information of the estimated point obtained by calculating is $[(x_2+x_6+x_7)/3, (y_2+y_6+y_7)/3, (z_2+z_6+z_7)/3]$.

Figure 3:
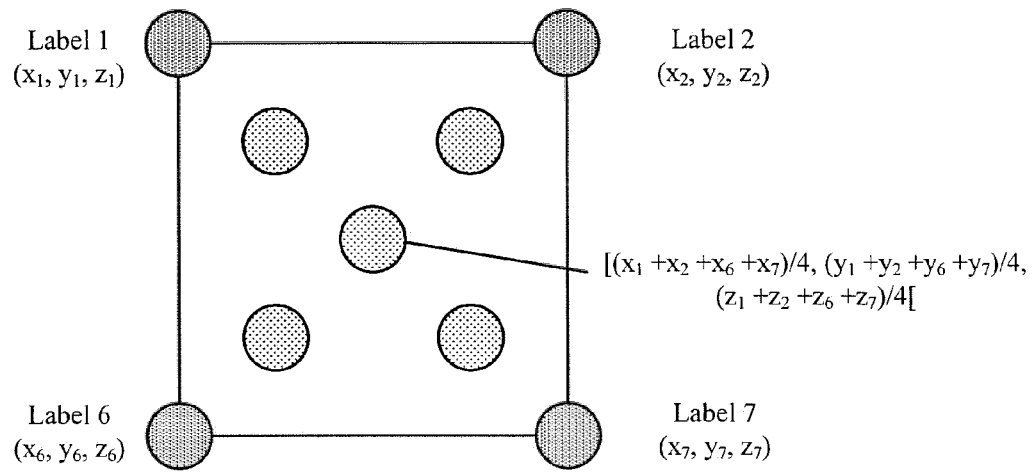
FIG. 3 is a schematic structural diagram of a location of a point that currently exists after the first differential calculation.

As shown in FIG. 3, which is a schematic structural diagram of a location of a point that currently exists after the first differential calculation.

It can be seen form FIG. 3 that, after the first difference calculation is performed on labels 1, 2, 6 and 7, one estimated point is obtained, and the number of points in measured and divided rasters is increased from 4 to 9 (that is, in addition to the four original points, one estimated point obtained in one differential calculation that is performed by using the four points as base points, and four estimated points separately obtained in four different differential calculations that are performed by using any three points as base points are added as points), which also means that a raster granularity becomes smaller, and positioning a terminal location in a changed raster increases accuracy of terminal location positioning.

The following manner of executing the second differential calculation to obtain a second estimated point after a first estimated point is obtained includes:

First, select, according to a point selection rule, at least three base points are selected from an original point obtained by measuring and/or a first estimated point obtained by calculating.

Locations of the at least three selected base points form an M-sided polygon, where M is a positive integer not smaller than 3.

The three selected base points may be two original points and one first estimated point, or may be two first estimated points and one original point, which is not limited herein.

Then, determine location information of the selected base points.

Finally, obtain location information of a second estimated point according to the location information of the selected base points.

It should be noted that, a manner of calculating a second estimated point is the same as a manner of calculating a first estimated point herein, and is not described in detail herein.

Step 102: Obtain a wireless eigenvalue of the estimated point by calculating according to a wireless eigenvalue of the original point obtained by measuring.

In step 102, the wireless eigenvalue of the estimated point is mainly obtained by calculating by using a mathematical simulation algorithm, which specifically includes the following steps:

First, determine an object for calculating the wireless eigenvalue, that is, the estimated point.

The estimated point includes a first estimated point, a second estimated point, . . . , and an $N^{th}$ estimated point.

Then, determine the location information of the original point used for obtaining the estimated point by calculating.

Assuming that it is determined that a estimated point for which a wireless eigenvalue is calculated is the first estimated point, the location information of the original point used for calculating the first estimated point is determined according to a manner of calculating the first estimated point in step 101.

For example, it is determined that $[(x_1+x_2+x_6+x_7)/4, (y_1+y_2+y_6+y_7)/4, (z_1+z_2+z_6+z_7)/4]$ are used for obtaining the estimated point by calculating, and it is determined, according to the manner of calculating the first estimated point in step 101, that the location information of the original point used for obtaining $[(x_1+x_2+x_6+x_7)/4, (y_1+y_2+y_6+y_7)/4, (z_1+z_2+z_6+z_7)/4]$ by calculating is $(x_1,y_1,z_1)$, $(x_2,y_2,z_2)$, $(x_6,y_6,z_6)$, and $(x_7,y_7,z_7)$.

Then, obtain, by using a geographic information system GIS according to the determined location information of the original point, a weight factor of a wireless eigenvalue of each determined original point relative to the estimated point that is obtained by calculating.

Specifically, after the location information of the original point is determined, a weight factor of a wireless eigenvalue of one original point relative to the estimated point is determined by a geographic location information system (Global Information System, GIS) according to a geographical environment state between the location information of the original point and the location information of the point.

For example, for an original point $(x_1,x_1,z_1)$ and a first estimated point $[(x_1+x_2+x_6+x_7)/4, (y_1+y_2+y_6+y_7)/4, (z_1+z_2+z_6+z_7)/4]$, the GIS determines, according to location information of the original point $(x_1,y_1,z_1)$ and location information of the first estimated point $[(x_1+x_2+x_6+x_7)/4, (y_1+y_2+y_6+y_7)/4, (z_1+z_2+z_6+z_7)/4]$, a geographical environment state (for example, there is a wall or an obstruction between the original point $(x_1,y_1,z_1)$ and the first estimated point $[(x_1+x_2+x_6+x_7)/4, (y_1+y_2+y_6+y_7)/4, (z_1+z_2+z_6+z_7)/4]$), and determines a weight factor $\alpha_1$. The weight factor $\alpha_1$ indicates a wireless characterization factor of the first estimated point $[(x_1+x_2+x_6+x_7)/4, (y_1+y_2+y_6+y_7)/4, (z_1+z_2+z_6+z_7)/4]$ relative to the original point $(x_1,y_1,z_1)$.

For another example, for an original point $(x_2,y_2,z_2)$ and a first estimated point $[(x_1+x_2+x_6+x_7)/4, (y_1+y_2+y_6+y_7)/4, (z_1+z_2+z_6+z_7)/4]$, the GIS determines, according to location information of the original point $(x_2,y_2,z_2)$ and location information of the first estimated point $[(x_1+x_2+x_6+x_7)/4, (y_1+y_2+y_6+y_7)/4, (z_1+z_2+z_6+z_7)/4]$, a geographical environment state (for example, there is no wall or obstruction between the original point $(x_2,y_2,z_2)$ and the first estimated point $[(x_1+x_2+x_6+x_7)/4, (y_1+y_2+y_6+y_7)/4, (z_1+z_2+z_6+z_7)/4]$, and determines a weight factor $\alpha_2$. The weight factor $\alpha_2$ indicates a wireless characterization factor of the first estimated point $[(x_1+x_2+x_6+x_7)/4, (y_1+y_2+y_6+y_7)/4, (z_1+z_2+z_6+z_7)/4]$ relative to the original point $(x_2,y_2,z_2)$.

Because a wireless eigenvalue is affected by an environment, when the GIS determines a wireless characterization factor according to a geographical environment state, the worse the geographical environment state is, the smaller a value of the wireless characterization factor is. For example, $\alpha_2$ is greater than $\alpha_1$.

After a wireless characterization factor of each original point relative to the estimated point that is obtained by calculating is obtained, the wireless eigenvalue of the estimated point is obtained by calculating by using the wireless eigenvalue of the original point in the following manner:

Wireless eigenvalue of a estimated point=Σ(Wireless eigenvalue of an original point×Wireless characterization factor corresponding to the original characteristic point).

For example, a wireless characterization factor of $(x_1,y_1,z_1)$ relative to the estimated point $[(x_1+x_2+x_6+x_7)/4, (y_1+y_2+y_6+y_7)/4, (z_1+z_2+z_6+z_7)/4]$ is $\alpha_1$; a wireless characterization factor of $(x_2,y_2,z_2)$ relative to the estimated point $[(x_1+x_2+x_6+x_7)/4, (y_1+y_2+y_6+y_7)/4, (z_1+z_2+z_6+z_7)/4]$ is $\alpha_2$; a wireless characterization factor of $(x_6,y_6,z_6)$ relative to the estimated point $[(x_1+x_2+x_6+x_7)/4, (y_1+y_2+y_6+y_7)/4, (z_1+z_2+z_6+z_7)/4]$ is $\alpha_3$; and a wireless characterization factor of $(x_7,y_7,z_7)$ relative to the estimated point $[(x_1+x_2+x_6+x_7)/4, (y_1+y_2+y_6+y_7)/4, (z_1+z_2+z_6+z_7)/4]$ is $\alpha_4$. Then, it is obtained that a wireless eigenvalue of the estimated point $[(x_1+x_2+x_6+x_7)/4, (y_1+y_2+y_6+y_7)/4, (z_1+z_2+z_6+z_7)/4]$ is $\alpha_1 \times$ a wireless eigenvalue of $(x_1,y_1,z_1)+\alpha_2\times$ a wireless eigenvalue of $(x_2,y_2,z_2)+\alpha_3\times$ a wireless eigenvalue of $(x_6,y_6,z_6)+\alpha_4\times$ a wireless eigenvalue of $(x_7,y_7,z_7)$.

It should be noted that, a manner of calculating the wireless eigenvalue of the first estimated point in this step may also be applied to a process of calculating another estimated point (for example, a second estimated point, . . . , an $N^{th}$ estimated point). The only difference lies in that, when a wireless eigenvalue of another estimated point after the second estimated point is calculated, location information of a base point used for calculating the another estimated point after the second estimated point is determined, that is, the determined location information of the original point in this step should be construed as the location information of the base point.

In addition, step 102 may further be implemented with step 101 at the same time. However, the wireless eigenvalue of the estimated point is determined at the same time when the location information of the estimated point is determined. The GIS directly determines a geographic state between the base point and the estimated point according to the location information of the base point used for calculating the estimated point, with no need to determine the location information of the base point used for calculating the estimated point again.

Optionally, after a difference calculation is executed for the determined number of times for each original point, a correspondence between location information of each original point and a wireless eigenvalue of the original point is established, and a correspondence between location information of each estimated point and a wireless eigenvalue of the estimated point is established. A wireless characteristics database is loaded and created according to multiple established correspondences, where the wireless characteristics database is used to use data stored in the wireless characteristics database to position a location of a terminal when the terminal needs to be positioned.

Step 103: When a wireless eigenvalue reported by a terminal is received, position a location of the terminal according to the wireless eigenvalue of the original point and the wireless eigenvalue of the estimated point.

In step 103, when the wireless eigenvalue reported by the terminal is received, a manner of positioning the location of the terminal includes but is not limited to the following manners:

Manner 1:

Compare wireless eigenvalues of multiple determined points (including: the wireless eigenvalue of the original point and the eigenvalue of the estimated point obtained by calculating) with the wireless eigenvalue reported by the terminal, calculate a Euclidean distance between a wireless eigenvalue of each point and the wireless eigenvalue reported by the terminal, sort Euclidean distances obtained by calculating according to a numerical size, and use location information of a point corresponding to a smallest Euclidean distance value as location information for positioning the terminal.

For example, it is assumed that determined points are 1, 2, 3, 4, 5, 6 and 7, and corresponding wireless eigenvalues are $R_1$, $R_2$, $R_3$, $R_4$, $R_5$, $R_6$ and $R_7$, respectively. The wireless eigenvalue reported by the terminal is R. A Euclidean distance between the wireless eigenvalue R1 of point 1 and the wireless eigenvalue R reported by the terminal is $|R_1-R|$. A Euclidean distance between the wireless eigenvalue $R_2$ of the point 2 and the wireless eigenvalue R reported by the terminal is $|R_2-R|$. A Euclidean distance between the wireless eigenvalue $R_3$ of the point 3 and the wireless eigenvalue R reported by the terminal is $|R_3-R|$. A Euclidean distance between the wireless eigenvalue $R_4$ of the point 4 and the wireless eigenvalue R reported by the terminal is $|R_4-R|$. A Euclidean distance between the wireless eigenvalue $R_5$ of the point 5 and the wireless eigenvalue R reported by the terminal is $|R_5-R|$. A Euclidean distance between the wireless eigenvalue $R_6$ of the point 6 and the wireless eigenvalue R reported by the terminal is $|R_6-R|$. A Euclidean distance between the wireless eigenvalue $R_7$ of the point 7 and the wireless eigenvalue R reported by the terminal is $|R_7-R|$. $|R_1-R|$, $|R_2-R|$, $|R_3-R|$, $|R_4-R|$, $|R_5-R|$, $|R_6-R|$ and $|R_7-R|$ that are obtained by calculating are compared, and location information of a point corresponding to a smallest Euclidean distance is selected. Assuming that a value of $|R_4-R|$ is the smallest, location information of a selected point corresponding to a smallest Euclidean distance is location information of the point 4, and the location information of the point 4 is used as the location information for positioning the terminal.

Manner 2:

After the wireless eigenvalue reported by the terminal is received, obtain, by comparing, a point with a Euclidean distance between a wireless eigenvalue of the point and the wireless eigenvalue reported by the terminal smaller than a set threshold; when there is only one point that satisfies the condition, use location information of the point as location information for positioning the terminal; and when there is more than one point that satisfies the condition, determine, in a linear averaging manner, location information of a location mean value point of the points that satisfy the condition, and use the location information of the determined location mean value point as the location information for positioning the terminal.

The set threshold is determined according to accuracy of terminal positioning, or is determined according to an actual requirement, or is determined according to an empirical value, which is not limited herein.

The foregoing calculating manner is still used as an example, the determined points are 1, 2, 3, 4, 5, 6 and 7, and corresponding wireless eigenvalues are $R_1$, $R_2$, $R_3$, $R_4$, $R_5$, $R_6$ and $R_7$, respectively. The wireless eigenvalue reported by the terminal is R. Seven Euclidean distances: $|R_1-R|$, $|R_2-R|$, $|R_3-R|$, $|R_4-R|$, $|R_5-R|$, $|R_6-R|$ and $|R_7-R|$ are obtained by calculating. Assuming that when only the Euclidean distance of $|R_4-R|$ is smaller than the set threshold and a label of a point corresponding to $R_4$ is 4, location information of the point 4 is used as location information for positioning the terminal. When $|R_2-R|$, $|R_3-R|$, $|R_4-R|$, and $|R_5-R|$ are all smaller than the set threshold, any one of points corresponding to $R_2$, $R_3$, $R_4$ and $R_5$, may be used as the location information for positioning the terminal, or location information of a location mean value point of points corresponding to $R_2$, $R_3$, $R_4$ and $R_5$ may also be calculated in a linear averaging manner, that is, the location mean value point of $(x_2,y_2,z_2)$, $(x_3,y_3,z_3)$, $(x_4,y_4,z_4)$ and $(x_5,y_5,z_5)$ is $[(x_2+x_3+x_4+x_5)/4, (y_2+y_3+y_4+y_5)/4, (z_2+z_3+z_4+z_5)/4]$, and $[(x_2+x_3+x_4+x_5)/4, (y_2+y_3+y_4+y_5)/4, (z_2+z_3+z_4+z_5)/4]$ is used as the location information for positioning the terminal.

Optionally, after the wireless eigenvalue reported by the terminal is received, the method further includes:

determining, according to the wireless eigenvalue reported by the terminal, a serving cell in which the terminal is currently located; and obtaining, according to a signal coverage area of the serving cell, an original point and a estimated point that exist within the signal coverage area of the serving cell.

Figure 4:
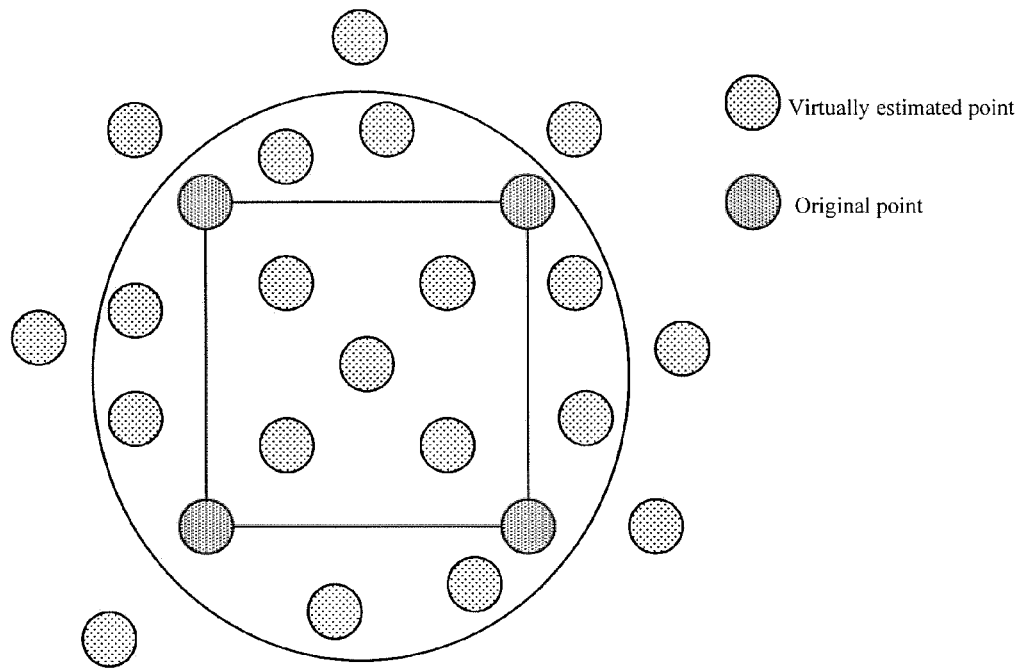
FIG. 4 is a schematic diagram for determining an original point and a estimated point within a cell.

For example, as shown in FIG. 4 which is a schematic diagram for determining an original point and a estimated point within a cell, after the wireless eigenvalue reported by the terminal is received, the serving cell in which the terminal is currently located is determined as cell A according to the wireless eigenvalue reported by the terminal (where, a signal coverage area of cell A is the circle in FIG. 4). The original point and the estimated point exist within the signal coverage area of the serving cell are obtained according to the signal coverage area of the serving cell, that is, points within the circle in FIG. 4 are an original point and a estimated point that exist within the signal coverage area of cell A. Points outside the circle in FIG. 4 are invalid points within the signal coverage area of cell A. In this way, comparison operations are effectively reduced, and efficiency of terminal location positioning is increased.

It should be noted that, the wireless eigenvalue in the embodiment of the present invention includes at least one or more of the following: a wireless signal strength indicator, a wireless signal time amount, a wireless signal frequency value, and a wireless signal codeword.

For example, a wireless signal strength indicator is RSSI (received signal strength indicator,) and/or RSRP (reference signal received power) or the like.

In the solution of Embodiment 1 of the present invention, location information of a estimated point is obtained by calculating by using a set algorithm according to location information that is of an original point and obtained by measuring; and a wireless eigenvalue of the estimated point is obtained by calculating according to a wireless eigenvalue of the original point obtained by measuring; and when a wireless eigenvalue reported by a terminal is received, a location of the terminal is positioned according to the wireless eigenvalue of the original point and the wireless eigenvalue of the estimated point. In this way, in a mathematical model manner, location information and a wireless eigenvalue of an unmeasured raster point are fitted, with no need to increase an additional measurement workload, thereby saving a resource. In addition, a division granularity of raster measurement may be changed according to an actual requirement, thereby improving accuracy of terminal positioning.

Embodiment 2

Figure 5:
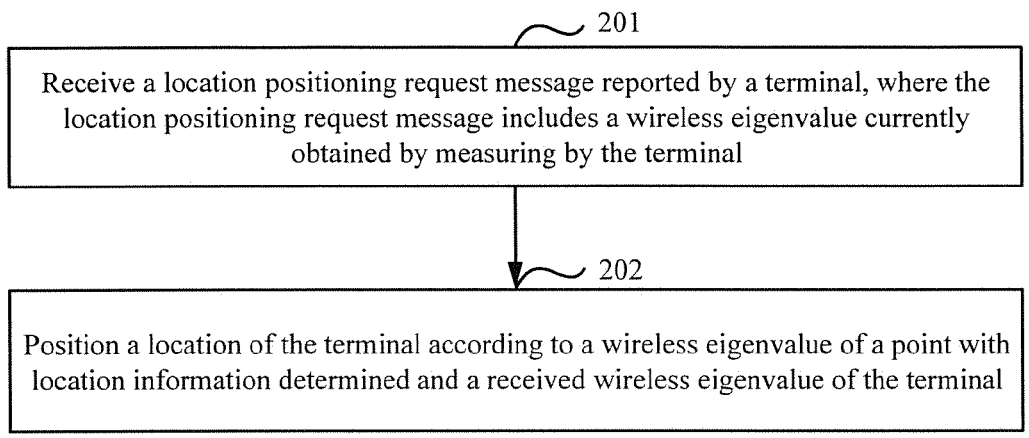
FIG. 5 is a flowchart of a method for positioning a terminal location according to Embodiment 2 of the present invention.

As shown in FIG. 5, which is a flowchart of a method for positioning a terminal location according to Embodiment 2 of the present invention, Embodiment 2 of the present invention is an invention under same ideas with Embodiment 1 of the present invention, and the method includes:

Step 201: Receive a location positioning request message reported by a terminal, where the location positioning request message includes a wireless eigenvalue currently obtained by measuring by the terminal.

Step 202: Position a location of the terminal according to a wireless eigenvalue of a point with location information determined and a received wireless eigenvalue of the terminal.

In step 202, in the first step, perform a differential calculation on the wireless eigenvalue of the point with the location information determined and the received wireless eigenvalue sent by the terminal.

It should be noted that, the point with the location information determined herein may be the original point mentioned in Embodiment 1 of the present invention, or may be a estimated point obtained after a differential calculation.

In the second step, determine whether a difference obtained by calculating is smaller than a set threshold. If the difference is smaller than the set threshold, use location information of a corresponding point with the difference smaller than the set threshold as location information for positioning the terminal. If the difference is not smaller than the set threshold, execute the third step.

In the third step, select, from the differences obtained by calculating, at least three base points with smaller differences as base points for positioning a terminal location.

Assume that four base points with smaller differences are selected.

In the fourth step, obtain location information of a first estimated point by calculating by using a set algorithm according to location information of the four selected base points, and obtain a wireless eigenvalue of the first estimated point by calculating according to wireless eigenvalues of the four selected base points.

A manner of "obtaining location information of a first estimated point by calculating by using a set algorithm" herein is the same as the manner of step 101 in Embodiment 1 of the present invention, and is not described in detail herein.

A manner of "obtaining a wireless eigenvalue of the first estimated point by calculating according to wireless eigenvalues of the four selected base points" herein is the same as the manner of step 102 in Embodiment 1 of the present invention, and is not described in detail herein.

In the fifth step, perform a differential calculation on the wireless eigenvalue of the first estimated point obtained by calculating and the wireless eigenvalue reported by the terminal, and determine whether a difference obtained by calculating is smaller than the set threshold. If the difference is smaller than the set threshold, use the location information of the first estimated point as the location information for positioning the terminal; and if the difference is not smaller than the set threshold, proceed to perform the sixth step.

In the sixth step, use the first estimated point as one base point, select, from the base points selected in the third step, at least two points as base points, and calculate location information and a wireless eigenvalue of a next estimated point in the manner of the fourth step.

In the seventh step, determine, according to the manner of the fifth step, whether a next point obtained by calculating is capable of positioning the location of the terminal; if the location of the terminal cannot be positioned according to a next point obtained by calculating, use the next estimated point as one base point, select, from the estimated point previously obtained by calculating and the base points selected in the third step, at least two points as base points for a current differential calculation, proceed to calculate the location information and the wireless eigenvalue of the next estimated point in the manner of the fourth step, execute the operation successively and circularly until it is determined that a difference between a wireless eigenvalue of a estimated point and the wireless eigenvalue sent by the terminal is smaller than the set threshold, use the location information of the estimated point as the location information for positioning the terminal, and end the operation.

In the manner of Embodiment 2 of the present invention, a location of a terminal is determined in a differential calculation manner according to a wireless eigenvalue reported by the terminal and a wireless eigenvalue of a point with location information determined, which not only refines a raster granularity in the prior art and improves accuracy of terminal location positioning, but also implements terminal location positioning in real time, without a limitation of a database capacity.

Embodiment 3

Figure 6:
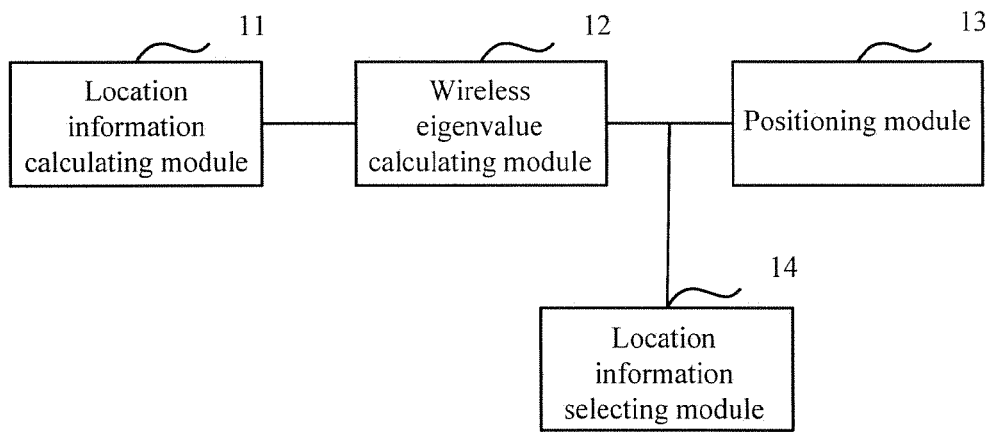
FIG. 6 is a schematic structural diagram of a device for positioning a terminal device location according to Embodiment 3 of the present invention.

As shown in FIG. 6, which is a schematic structural diagram of a device for positioning a terminal device location according to Embodiment 3 of the present invention, Embodiment 3 of the present invention, Embodiment 1 of the present invention, and Embodiment 2 of the present invention belong to an invention under same ideas, and the device includes: a location information calculating module 11, a wireless eigenvalue calculating module 12, and a positioning module 13.

The location information calculating module 11 is configured to obtain location information of a estimated point by calculating by using a set algorithm according to location information of an original point.

The wireless eigenvalue calculating module 12 is configured to obtain a wireless eigenvalue of the estimated point by calculating according to a wireless eigenvalue of the original point obtained by measuring.

The positioning module 13 is configured to: when a wireless eigenvalue reported by a terminal is received, position a location of the terminal according to the wireless eigenvalue of the original point and the wireless eigenvalue of the estimated point obtained by calculating by using the wireless eigenvalue calculating module.

In another implementation manner provided in the present invention, the location information includes a latitude value and a longitude value; and the location information calculating module 11 is specifically configured to select at least three base points according to a point selection rule and the number of differential calculation times, where the base points include at least one or more of the original point and a estimated point that is obtained by calculating in the previous $T^{th}$ differential calculation, and locations of the at least three selected base points form an M-sided polygon, where T is a positive integer greater than zero and smaller than the number of differential calculation times, the $T+1^{th}$ differential calculation is being executed currently, and M is a positive integer not smaller than 3; and calculate a mean value of latitude values and a mean value of longitude values of the at least three selected base points, and use a location corresponding to the calculated mean value of the latitude values and the calculated mean value of the longitude values as location information of one estimated point.

In another implementation manner provided in the present invention, the location information further includes a height value; and the location information calculating module 11 is further configured to calculate a mean value of height values of the at least three selected base points, and use a location corresponding to the calculated mean value of the latitude values, the calculated mean value of the longitude values, and the calculated mean value of the height values as location information of one estimated point.

In another implementation manner provided in the present invention, the location information calculating module 11 is specifically configured to: when the number of differential calculation times is N, select, according to the following manner, base points executing a differential calculation each time, where three base points selected each time form a triangle:

base points of the first differential calculation are three original points obtained by measuring;

base points of the second differential calculation are two original points obtained by measuring and one estimated point obtained after the first differential calculation;

base points of the third differential calculation are one original point obtained by measuring, one estimated point obtained after the first differential calculation, and one estimated point obtained after the second differential calculation, or are two original points obtained by measuring and one estimated point obtained after the second differential calculation; and base points of the $N^{th}$ differential calculation are two original points obtained by measuring and one estimated point obtained after the N-1$^{th}$ differential calculation, or are one estimated point obtained after the N-A$^{th}$ differential calculation, one estimated point obtained after the N-B$^{th}$ differential calculation, and one estimated point obtained after the N-1$^{th}$ differential calculation, where N is greater than 3 and is the set number of differential times, and A is different from B and is a positive integer smaller than N.

In another implementation manner provided in the present invention, the location information calculating module 11 is specifically configured to: when the number of differential calculation times is N, select, according to the following manner, base points executing a differential calculation each time, where four base points selected each time form a tetragon:

base points of the first differential calculation are four original points obtained by measuring;

base points of the second differential calculation are two original points obtained by measuring and two estimated points obtained after the first differential calculation;

base points of the third differential calculation are one original point obtained by measuring, one estimated point obtained after the first differential calculation, and two estimated points obtained after the second differential calculation; and base points of the $N^{th}$ differential calculation are two estimated points obtained after the N-1$^{th}$ differential calculation, one estimated point obtained after the N-2$^{th}$ differential calculation, and one point selected from a estimated point obtained after the previous N-3$^{th}$ differential calculation and the original point, where N is a positive integer greater than 3.

In another implementation manner provided in the present invention, the wireless eigenvalue calculating module 12 is specifically configured to determine the location information that is of the original point and used for obtaining the estimated point by calculating;

obtain, by using a geographic information system GIS according to the determined location information of the original point, a weight factor of a wireless eigenvalue of each determined original point relative to the estimated point that is obtained by calculating; and obtain the wireless eigenvalue of the estimated point by calculating according to the wireless eigenvalue of the determined original point and the corresponding weight factor.

In another implementation manner provided in the present invention, the device further includes: a location information selecting module 14, where:

the location information selecting module 14 is specifically configured to: after the wireless eigenvalue reported by the terminal is received, determine, according to the wireless eigenvalue reported by the terminal, a serving cell in which the terminal is currently located; and obtain, according to a signal coverage area of the serving cell, an original point and a estimated point that exist within the signal coverage area of the serving cell.

In another implementation manner provided in the present invention, the positioning module 13 is specifically configured to separately calculate a Euclidean distance between the wireless eigenvalue reported by the terminal and the obtained wireless eigenvalue of the original point, and a Euclidean distance between the wireless eigenvalue reported by the terminal and the obtained wireless eigenvalue of the estimated point; and determine a location corresponding to a wireless eigenvalue with a Euclidean distance that is obtained by calculating and smaller than a set threshold, and position the determined location as the location of the terminal.

In another implementation manner provided in the present invention, the wireless eigenvalue includes at least one or more of the following: a wireless signal strength indicator, a wireless signal time amount, a wireless signal frequency value, and a wireless signal codeword.

It should be noted that, the device involved in Embodiment 3 of the present invention may be a physical entity unit implemented by hardware, or may be a logical part implemented by software, which is not limited herein.

Embodiment 4

Figure 7:
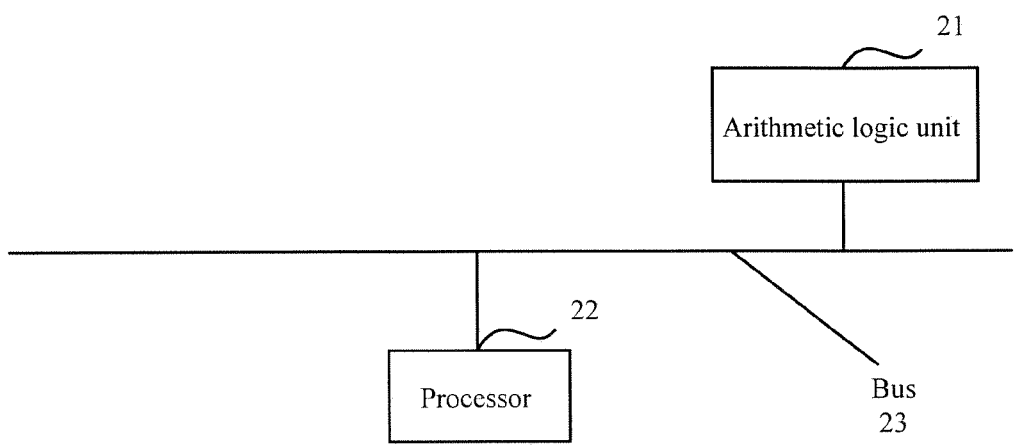
FIG. 7 is a schematic structural diagram of a device for positioning a terminal device location according to Embodiment 4 of the present invention.

As shown in FIG. 7, which is a schematic structural diagram of a device for positioning a terminal device location according to Embodiment 4 of the present invention, Embodiment 4 of the present invention, Embodiment 1 of the present invention, and Embodiment 2 of the present invention belong to an invention under same ideas, and the device includes: an arithmetic logic unit 21 and a processor 22, where the arithmetic logic unit 21 and the processor 22 are connected through a bus 23.

The arithmetic logic unit 21 is configured to obtain location information of a estimated point by calculating by using a set algorithm according to location information of an original point; and obtain a wireless eigenvalue of the estimated point by calculating according to a wireless eigenvalue of the original point obtained by measuring.

The processor 22 is configured to: when a wireless eigenvalue reported by a terminal is received, position a location of the terminal according to the wireless eigenvalue of the original point and the wireless eigenvalue of the estimated point.

In another implementation manner provided in the present invention, the location information includes a latitude value and a longitude value;

the arithmetic logic unit 21 is specifically configured to select at least three base points according to a point selection rule and the number of differential calculation times, where the base points include at least one or more of the original point and a estimated point that is obtained by calculating in the previous $T^{th}$ differential calculation, and locations of the at least three selected base points form an M-sided polygon, where T is a positive integer greater than zero and smaller than the number of differential calculation times, the $T+1^{th}$ differential calculation is being executed currently, and M is a positive integer not smaller than 3; and calculate a mean value of latitude values and a mean value of longitude values of the at least three selected base points, and use a location corresponding to the calculated mean value of the latitude values and the calculated mean value of the longitude values as location information of one estimated point.

In another implementation manner provided in the present invention, the location information further includes a height value; and the arithmetic logic unit 21 is further configured to: after the mean value of the latitude values and the mean value of the longitude values of the at least three selected base points are obtained by calculating, calculate a mean value of height values of the at least three selected base points, and use a location corresponding to the calculated mean value of the latitude values, the calculated mean value of the longitude values, and the calculated mean value of the height values as location information of one estimated point.

In another implementation manner provided in the present invention, the arithmetic logic unit 21 is specifically configured to: when the number of differential calculation times is N, select, according to the following manner, base points executing a differential calculation each time, where three base points selected each time form a triangle:

base points of the first differential calculation are three original points obtained by measuring;

base points of the second differential calculation are two original points obtained by measuring and one estimated point obtained after the first differential calculation;

base points of the third differential calculation are one original point obtained by measuring, one estimated point obtained after the first differential calculation, and one estimated point obtained after the second differential calculation, or are two original points obtained by measuring and one estimated point obtained after the second differential calculation; and base points of the $N^{th}$ differential calculation are two original points obtained by measuring and one estimated point obtained after the $N-1^{th}$ differential calculation, or are one estimated point obtained after the $N-A^{th}$ differential calculation, one estimated point obtained after the $N-B^{th}$ differential calculation, and one estimated point obtained after the $N-1^{th}$ differential calculation, where N is greater than 3 and is the set number of differential times, and A is different from B and is a positive integer smaller than N.

In another implementation manner provided in the present invention, the arithmetic logic unit 21 is specifically configured to: when the number of differential calculation times is N, select, according to the following manner, base points executing a differential calculation each time, where four base points selected each time form a tetragon:

base points of the first differential calculation are four original points obtained by measuring;

base points of the second differential calculation are two original points obtained by measuring and two estimated points obtained after the first differential calculation;

base points of the third differential calculation are one original point obtained by measuring, one estimated point obtained after the first differential calculation, and two estimated points obtained after the second differential calculation; and base points of the $N^{th}$ differential calculation are two estimated points obtained after the $N-1^{th}$ differential calculation, one estimated point obtained after the $N-2^{th}$ differential calculation, and one point selected from a estimated point obtained after the previous $N-3^{th}$ differential calculation and the original point, where N is a positive integer greater than 3.

In another implementation manner provided in the present invention, the arithmetic logic unit 21 is specifically configured to determine the location information that is of the original point and used for obtaining the estimated point by calculating;

obtain, by using a geographic information system GIS according to the determined location information of the original point, a weight factor of a wireless eigenvalue of each determined original point relative to the estimated point that is obtained by calculating; and obtain the wireless eigenvalue of the estimated point by calculating according to the wireless eigenvalue of the determined original point and the corresponding weight factor.

In another implementation manner provided in the present invention, the processor 22 is further configured to: after the wireless eigenvalue reported by the terminal is received, determine, according to the wireless eigenvalue reported by the terminal, a serving cell in which the terminal is currently located; and obtain, according to a signal coverage area of the serving cell, an original point and a estimated point that exist within the signal coverage area of the serving cell.

In another implementation manner provided in the present invention, the processor 22 is specifically configured to separately calculate a Euclidean distance between the wireless eigenvalue reported by the terminal and the obtained wireless eigenvalue of the original point, and a Euclidean distance between the wireless eigenvalue reported by the terminal and the obtained wireless eigenvalue of the estimated point; and determine a location corresponding to a wireless eigenvalue with a Euclidean distance that is obtained by calculating and smaller than a set threshold, and position the determined location as the location of the terminal.

In another implementation manner provided in the present invention, the wireless eigenvalue includes at least one or more of the following: a wireless signal strength indicator, a wireless signal time amount, a wireless signal frequency value, and a wireless signal codeword.

It should be noted that, the processor in the device involved in Embodiment 4 of the present invention may be a central processing unit, or may be another processing device into which a control program is written, which is not limited herein.

A person skilled in the art should understand that the embodiments of the present invention may be provided as a method, an apparatus (device), or a computer program product. Therefore, the present invention may use a form of hardware only embodiments, software only embodiments, or embodiments with a combination of software and hardware. Moreover, the present application may use a form of a computer program product that is implemented on one or more computer-usable storage media (including but not limited to a disk memory, a CD-ROM, an optical memory, and the like) that include computer usable program code.

The present invention is described with reference to the flowcharts and/or block diagrams of the method, the apparatus (device), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are executed on the computer or the other programmable device, thereby generating computer-implemented processing. Therefore, the instructions executed on the computer or the other programmable device provide steps for implementing a specific function in one or more processes in the flowcharts and/or in one or more blocks in the block diagrams.

Although some preferred embodiments of the present application have been described, persons skilled in the art can make changes and modifications to these embodiments once they learn the basic inventive concept of these embodiments. Therefore, the following claims are intended to be construed as to cover the preferred embodiments and all changes and modifications falling within the scope of the present application.

It is apparent that a person skilled in the art can make various modifications and variations to the present invention without departing from the spirit and scope of the present invention. The present invention is intended to cover these modifications and variations provided that they fall within the scope of protection defined by the following claims or their equivalent technologies.

What is claimed is:

1. A positioning method at a device for positioning a terminal, the method comprising:

calculating location information of an estimated point by using a set algorithm according to location information of an original point; calculating a wireless eigenvalue of the estimated point according to a wireless eigenvalue of the original point obtained by measuring, and when a wireless eigenvalue reported by a terminal is received, positioning a location of the terminal according to the wireless eigenvalue of the original point and the wireless eigenvalue of the estimated point wherein the location information comprises a latitude value and a longitude value; and calculating location information of a estimated point by using a set algorithm according to location information of an original point obtained by measuring comprises:

selecting at least three base points according to a point selection rule and the number of differential calculation times, wherein the base points comprise at least one or more of the original point and a estimated point that is obtained by calculating in the previous $T^{th}$ differential calculation, and locations of the at least three selected base points form an M-sided polygon, wherein T is a positive integer greater than zero and smaller than the number of differential calculation times, the $T+1^{th}$ differential calculation is being executed currently, and M is a positive integer not smaller than 3, and calculating a mean value of latitude values and a mean value of longitude values of the at least three selected base points, and using a location corresponding to the calculated mean value of the latitude values and the calculated mean value of the longitude values as location information of one estimated point.

2. The method according to claim 1, wherein:

the location information further comprises a height value; and after calculating the mean value of the latitude values and the mean value of the longitude values of the at least three selected base points, the method further comprises:

calculating a mean value of height values of the at least three selected base points, and using a location corresponding to the calculated mean value of the latitude values, the calculated mean value of the longitude values, and the calculated mean value of the height values as location information of one estimated point.

3. The method according to claim 1, wherein selecting three base points according to a point selection rule and the number of differential calculation times, comprises:

when the number of differential calculation times is N, selecting, according to the following manner, base points performing a differential calculation each time, wherein three base points selected each time form a triangle:

base points of the first differential calculation are three original points obtained by measuring;

base points of the second differential calculation are two original points obtained by measuring and one estimated point obtained after the first differential calculation;

base points of the third differential calculation are one original point obtained by measuring, one estimated point obtained after the first differential calculation, and one estimated point obtained after the second differential calculation, or are two original points obtained by measuring and one estimated point obtained after the second differential calculation; and base points of the Nth differential calculation are two original points obtained by measuring and one estimated point obtained after the N−1$^{th}$ differential calculation, or are one estimated point obtained after the N−A$^{th}$ differential calculation, one estimated point obtained after the N−B$^{th}$ differential calculation, and one estimated point obtained after the N−Ith differential calculation, wherein N is greater than 3 and is the set number of differential times, and A is different from B and is a positive integer smaller than N.

4. The method according to claim 1, wherein selecting four base points according to the point selection rule and the number of differential calculation times comprises:

when the number of differential calculation times is N, selecting, according to the following manner, base points executing a differential calculation each time, wherein four base points selected each time form a tetragon:

base points of the first differential calculation are four original points obtained by measuring;

base points of the second differential calculation are two original points obtained by measuring and two estimated points obtained after the first differential calculation;

base points of the third differential calculation are one original point obtained by measuring, one estimated point obtained after the first differential calculation, and two estimated points obtained after the second differential calculation; and base points of the Nth differential calculation are two estimated points obtained after the N−1$^{th}$ differential calculation, one estimated point obtained after the N−2$^{th}$ differential calculation, and one point selected from a estimated point obtained after the previous N−3$^{th}$ differential calculation and the original point, wherein N is a positive integer greater than 3.

5. The method according to claim 1, wherein obtaining a wireless eigenvalue of the estimated point by calculating according to a wireless eigenvalue of the original point obtained by measuring comprises:

determining the location information that is of the original point and used for obtaining the estimated point by calculating;

obtaining, by using a geographic information system GIS according to the determined location information of the original point, a weight factor of a wireless eigenvalue of each determined original point relative to the estimated point that is obtained by calculating; and obtaining the wireless eigenvalue of the estimated point by calculating according to the wireless eigenvalue of the determined original point and a weight factor corresponding to the wireless eigenvalue.

6. The method according to claim 1, wherein after the wireless eigenvalue reported by the terminal is received, the method further comprises:

determining, according to the wireless eigenvalue reported by the terminal, a serving cell in which the terminal is currently located; and obtaining, according to a signal coverage area of the serving cell, an original point and a estimated point that exist within the signal coverage area of the serving cell.

7. The method according to claim 6, wherein positioning a location of the terminal according to the wireless eigenvalue of the original point and the wireless eigenvalue of the estimated point comprises:

separately calculating a Euclidean distance between the wireless eigenvalue reported by the terminal and the obtained wireless eigenvalue of the original point, and a Euclidean distance between the wireless eigenvalue reported by the terminal and the obtained wireless eigenvalue of the estimated point; and determining a location corresponding to a wireless eigenvalue with a Euclidean distance that is obtained by calculating and smaller than a set threshold, and positioning the determined location as the location of the terminal.

8. The method according to claim 1, wherein the wireless eigenvalue comprises at least one or more of the following: a wireless signal strength indicator, a wireless signal time amount, a wireless signal frequency value, and a wireless signal codeword.

9. A device for positioning a terminal, the device comprising: a receiver configured to receive a wireless eigenvalue reported by a terminal; and a processor configured to:

calculate location information of a estimated point by using a set algorithm according to location information of an original point, and calculate a wireless eigenvalue of the estimated point according to a wireless eigenvalue of the original point obtained by measuring, and when the wireless eigenvalue reported by the terminal is received, position a location of the terminal according to the wireless eigenvalue of the original point and the wireless eigenvalue of the estimated point wherein the location information comprises a latitude value and a longitude value; and the processor is further configured to:

select at least three base points according to a point selection rule and the number of differential calculation times, wherein the base points comprise at least one or more of the original point and a estimated point that is obtained by calculating in the previous T$^{th}$ differential calculation, and locations of the at least three selected base points form an M-sided polygon, wherein T is a positive integer greater than zero and smaller than the number of differential calculation times, the T+1$^{th}$ differential calculation is being executed currently, and M is a positive integer not smaller than 3, and calculate a mean value of latitude values and a mean value of longitude values of the at least three selected base points, and use a location corresponding to the calculated mean value of the latitude values and the calculated mean value of the longitude values as location information of one estimated point.

10. The device according to claim 9, wherein: the location information further comprises a height value; and the processor is further configured to calculate a mean value of height values of the at least three selected base points, and use a location corresponding to the calculated mean value of the latitude values, the calculated mean value of the longitude values, and the calculated mean value of the height values as location information of one estimated point.

11. The device according to claim 9, wherein the processor is further configured to, when the number of differential calculation times is N, select, according to the following manner, base points executing a differential calculation each time, wherein three base points selected each time form a triangle:
- base points of the first differential calculation are three original points obtained by measuring;
- base points of the second differential calculation are two original points obtained by measuring and one estimated point obtained after the first differential calculation;
- base points of the third differential calculation are one original point obtained by measuring, one estimated point obtained after the first differential calculation, and one estimated point obtained after the second differential calculation, or are two original points obtained by measuring and one estimated point obtained after the second differential calculation; and
- base points of the $N^{th}$ differential calculation are two original points obtained by measuring and one estimated point obtained after the $N-1^{th}$ differential calculation, or are one estimated point obtained after the $N-A^{th}$ differential calculation, one estimated point obtained after the $N-B^{th}$ differential calculation, and one estimated point obtained after the $N-1^{th}$ differential calculation, wherein N is greater than 3 and is the set number of differential times, and A is different from B and is a positive integer smaller than N.

12. The device according to claim 9, wherein the processor is further configured to, when the number of differential calculation times is N, select, according to the following manner, base points executing a differential calculation each time, wherein four base points selected each time form a tetragon:
- base points of the first differential calculation are four original points obtained by measuring;
- base points of the second differential calculation are two original points obtained by measuring and two estimated points obtained after the first differential calculation;
- base points of the third differential calculation are one original point obtained by measuring, one estimated point obtained after the first differential calculation, and two estimated points obtained after the second differential calculation; and
- base points of the $N^{th}$ differential calculation are two estimated points obtained after the $N-1^{th}$ differential calculation, one estimated point obtained after the $N-2^{th}$ differential calculation, and one point selected from a estimated point obtained after the previous $N-3^{th}$ differential calculation and the original point, wherein N is a positive integer greater than 3.

13. The device according to claim 9, wherein the processor is further configured to:
- determine the location information that is of the original point and used for obtaining the estimated point by calculating;
- obtain, by using a geographic information system (GIS) according to the determined location information of the original point, a weight factor of a wireless eigenvalue of each determined original point relative to the estimated point that is obtained by calculating; and
- obtain the wireless eigenvalue of the estimated point by calculating according to the wireless eigenvalue of the determined original point and the corresponding weight factor.

14. The device according to claim 9, wherein the processor is further configured to:
- after the wireless eigenvalue reported by the terminal is received, determine, according to the wireless eigenvalue reported by the terminal, a serving cell in which the terminal is currently located; and
- obtain, according to a signal coverage area of the serving cell, an original point and a estimated point that exist within the signal coverage area of the serving cell.

15. The device according to claim 14, wherein the processor is further configured to: separately calculate a Euclidean distance between the wireless eigenvalue reported by the terminal and the obtained wireless eigenvalue of the original point, and a Euclidean distance between the wireless eigenvalue reported by the terminal and the obtained wireless eigenvalue of the estimated point; and
- determine a location corresponding to a wireless eigenvalue with a Euclidean distance that is obtained by calculating and smaller than a set threshold, and position the determined location as the location of the terminal.

16. The device according to claim 9, wherein the wireless eigenvalue comprises at least one or more of the following: a wireless signal strength indicator, a wireless signal time amount, a wireless signal frequency value, and a wireless signal codeword.

* * * * *